(12) United States Patent
Wu et al.

(10) Patent No.: US 11,997,066 B2
(45) Date of Patent: May 28, 2024

(54) DATA TRANSMISSION SYSTEM AND METHOD FOR EDGE COMPUTING AND COMPUTER READABLE MEDIUM THEREOF

(71) Applicant: CHUNGHWA TELECOM CO., LTD., Taoyuan (TW)

(72) Inventors: Yi-Hua Wu, Taoyuan (TW); Wei-Shan Lu, Taoyuan (TW); Kang-Hao Lo, Taoyuan (TW); Cheng-Yi Chien, Taoyuan (TW); Yueh-Feng Li, Taoyuan (TW); Ling-Chih Kao, Taoyuan (TW)

(73) Assignee: CHUNGHWA TELECOM CO., LTD., Taoyuan (TW)

( * ) Notice: Subject to any disclaimer, the term of this patent is extended or adjusted under 35 U.S.C. 154(b) by 0 days.

(21) Appl. No.: 18/152,070

(22) Filed: Jan. 9, 2023

(65) Prior Publication Data
US 2023/0262026 A1  Aug. 17, 2023

(30) Foreign Application Priority Data

Feb. 11, 2022  (TW) .................................. 111105125

(51) Int. Cl.
*H04L 61/4511* (2022.01)
*H04W 8/26* (2009.01)
*H04W 68/00* (2009.01)

(52) U.S. Cl.
CPC ........... *H04L 61/4511* (2022.05); *H04W 8/26* (2013.01); *H04W 68/00* (2013.01)

(58) Field of Classification Search
CPC ...... H04L 61/4511; H04W 8/26; H04W 68/00
See application file for complete search history.

(56) References Cited

U.S. PATENT DOCUMENTS

| | | | |
|---|---|---|---|
| 8,060,768 B2 * | 11/2011 | Tsai .................... | H04W 52/027 713/323 |
| 2008/0207225 A1 * | 8/2008 | Bedekar ................ | H04W 68/02 707/999.107 |
| 2009/0197622 A1 * | 8/2009 | Atarius .................... | H04L 51/23 455/466 |
| 2015/0009844 A1 * | 1/2015 | Kneckt ................. | H04W 76/28 370/252 |
| 2015/0312700 A1 * | 10/2015 | Wang ...................... | H04W 4/70 370/329 |

(Continued)

*Primary Examiner* — David R Lazaro
(74) *Attorney, Agent, or Firm* — HSML P.C.

(57) ABSTRACT

A data transmission system and method thereof for edge computing are provided. A terminal mobile station international subscriber directory number (MSISDN) and a terminal IP of a target terminal are obtained with a domain name system (DNS) by a device providing communication services from the data transmission system. After data packets are sent to the data transmission system, if the target terminal is in an idle mode, a paging message is sent by a terminal wake-up module to enable the target terminal to return to a connected mode for communication. Before a connection is established between the data transmission system and the target terminal, downlink data packets can be temporarily stored, and the packets can be sent after the target terminal is in the connected mode. A computer readable medium for executing the data transmission method is also provided.

11 Claims, 8 Drawing Sheets

(56) References Cited

U.S. PATENT DOCUMENTS

2022/0201795 A1\* 6/2022 Newman ............. H04W 68/005
2023/0262026 A1\* 8/2023 Wu ........................ H04W 8/26
                                                                  709/245

\* cited by examiner

DATA TRANSMISSION SYSTEM AND METHOD FOR EDGE COMPUTING AND COMPUTER READABLE MEDIUM THEREOF

BACKGROUND

1. Technical Field

The present disclosure relates to data transmission technologies, and more particularly, to a data transmission system and method for edge computing and a computer readable medium thereof.

2. Description of Related Art

In some mobile edge computing (MEC) application scenarios, a device behind an edge computing platform often needs to actively send data to a terminal. However, currently, almost all terminals use dynamic IP configurations. As such, the device cannot actively know the IP address obtained by the terminal. Hence, a mobile station international subscriber directory number (MSISDN) is often used to query the IP address of a terminal. But such a method has some drawbacks. For example, after the terminal enters an idle mode, the edge computing platform cannot actively send packets to the terminal and the device cannot communicate with the terminal. In other words, in the conventional technology, the device cannot actively transmit data to a client end that is in an idle mode. Therefore, to achieve active transmission, the device needs to use connection-holding interface technologies of an application layer or transmission layer, which however limits the type of communication applications.

Therefore, in view of the aforementioned problems of the prior art, there is a need in the art to provide data transmission technologies so as to allow a device behind an edge computing platform to transmit data to a client end in an idle mode without using conventional connection-holding interface technologies of an application layer or transmission layer, thereby increasing the service type and flexibility.

SUMMARY

In view of the above-described drawbacks of the prior art, the present disclosure provides a data transmission system for edge computing, which comprises: a mobile station international subscriber directory number (MSISDN) query module configured to receive a domain name system (DNS) query message from a device to obtain MSISDN information; a subscriber awareness module configured to receive the MSISDN information, obtain an IP address of a target terminal according to the MSISDN information and send the IP address of the target terminal back to the MSISDN query module for the MSISDN query module to generate a DNS reply message based on the IP address of the target terminal and send the DNS reply message back to the device; and a traffic data transmit and temporary storage module configured to receive data packets generated and sent by the device according to the DNS reply message to forward or temporarily store the data packets.

In an embodiment, the DNS query message is generated when the device wants to send the data packets.

In an embodiment, the traffic data transmit and temporary storage module first analyzes whether the target terminal is in a connected mode after receiving the data packets, wherein the traffic data transmit and temporary storage module forwards the data packets to the target terminal via a base station if the target terminal is in the connected mode, or wherein the traffic data transmit and temporary storage module temporarily stores the data packets if the target terminal is in an idle mode and forwards the data packets when the target terminal is in the connected mode.

In an embodiment, the data transmission system further comprises a terminal wake-up module configured to receive a paging message to wake up the target terminal according to the paging message, wherein the paging message is generated by the traffic data transmit and temporary storage module when the traffic data transmit and temporary storage module temporarily stores the data packets.

In an embodiment, the terminal wake-up module uses the IP address of the target terminal to query the subscriber awareness module about identity information of a user to generate the paging message.

In an embodiment, the traffic data transmit and temporary storage module sets a user online timer to determine whether the target terminal returns to the connected mode within a predefined time when the communication sending and temporary storage temporarily stores the data packets, wherein the traffic data transmit and temporary storage module discards the data packets if the target terminal fails to return to the connected mode within the predefined time.

The present disclosure further provides a data transmission method for edge computing. The data transmission method is executed by a computer device and comprises the steps of: receiving, by a mobile station international subscriber directory number (MSISDN) query module, a domain name system (DNS) query message from a device to obtain MSISDN information; receiving, by a subscriber awareness module, the MSISDN information of the MSISDN query module, wherein the subscriber awareness module obtains an IP address of a target terminal according to the MSISDN information and sends the IP address of the target terminal back to the MSISDN query module; generating, by the MSISDN query module, a DNS reply message based on the IP address of the target terminal; sending the DNS reply message back to the device; sending, by the device, data packets to a traffic data transmit and temporary storage module according to the DNS reply message; and receiving, by the traffic data transmit and temporary storage module, the data packets to forward or temporarily store the data packets.

In an embodiment, the step of receiving the data packets by the traffic data transmit and temporary storage module to forward or temporarily store the data packets comprises: analyzing, by the traffic data transmit and temporary storage module, whether the target terminal is in a connected mode, wherein the traffic data transmit and temporary storage module forwards the data packets to the target terminal via a base station if the target terminal is in the connected mode, or wherein the traffic data transmit and temporary storage module temporarily stores the data packets if the target terminal is in an idle mode and forwards the data packets when the target terminal is in the connected mode.

In an embodiment, the traffic data transmit and temporary storage module notifies a terminal wake-up module to send a paging message to wake up the target terminal after temporarily storing the data packets, and wherein the traffic data transmit and temporary storage module sends the data packets to the target terminal after the target terminal returns to the connected mode.

In an embodiment, the data transmission method further comprises setting, by the traffic data transmit and temporary storage module, a user online timer to determine whether the target terminal returns to the connected mode within a predefined time when the traffic data transmit and temporary storage module temporarily stores the data packets, wherein the traffic data transmit and temporary storage module discards the data packets if the target terminal fails to return to the connected mode within the predefined time.

The present disclosure further provides a computer readable medium applied in a computing device or computer and storing instructions for performing the above-described data transmission method for edge computing.

Therefore, by using the principle of DNS communication protocol, the present disclosure allows the device to obtain IP information of a target terminal according to a MSISDN. As such, even if the target terminal is in an idle mode, the present disclosure can actively wake up the target terminal so as to cause the device to actively send communication services to the target terminal without limiting the type of communication protocol of the upper-layer application service, thereby greatly increasing the service type and flexibility, and meeting the needs of users.

DETAILED DESCRIPTIONS

The following illustrative embodiments are provided to illustrate the present disclosure, these and other advantages and effects can be apparent to those in the art after reading this specification.

Figure 1:
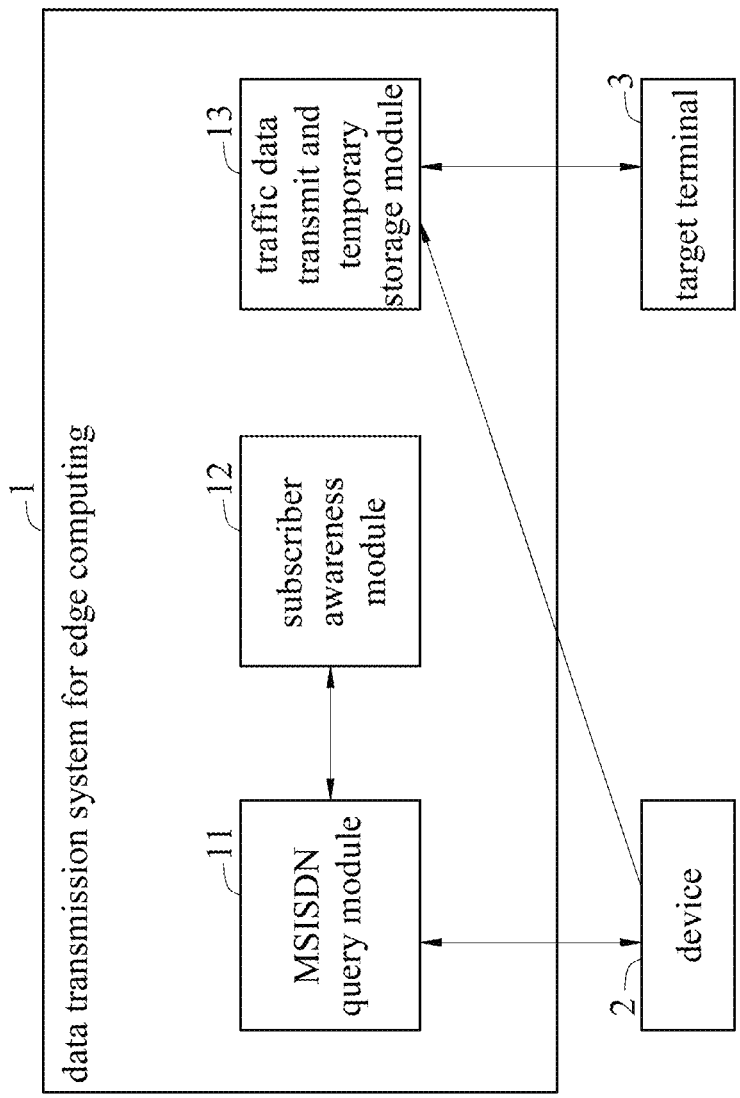
FIG. 1 is a schematic architecture diagram of a data transmission system for edge computing according to the present disclosure.

FIG. 1 is a schematic architecture diagram of a data transmission system for edge computing according to the present disclosure. As shown, a data transmission system 1 for edge computing of the present disclosure can operate on an edge computing platform so as to allow a device 2 (e.g., a server that provides services) to transmit data to a target terminal 3 (e.g., a user device), wherein the data transmission system 1 for edge computing has a mobile station international subscriber directory number (MSISDN) query module 11, a subscriber awareness module 12 and a traffic data transmit and temporary storage module 13.

The MSISDN query module 11 is used to receive a domain name system (DNS) query message from the device 2 so as to obtain MSISDN information. In other words, the MSISDN query module 11 receives the DNS query message from the device 2 so as to obtain the MSISDN information related to the target terminal 3, wherein the query message has a block with the MSISDN information, and the MSISDN query module 11 can obtain the MSISDN information therefrom.

In an embodiment, the DNS query message is generated when the device 2 wants to send data packets. That is, if the device 2 wants to send data packets, it generates and transmits the DNS query message to the data transmission system 1 for edge computing so as to query the position of the target terminal 3.

The subscriber awareness module 12 is used to receive the MSISDN information, obtain an IP address of the target terminal according to the MSISDN information and send the IP address of the target terminal back to the MSISDN query module 11. As such, the MSISDN query module 11 can generate a DNS reply message based on the IP address of the target terminal and send the DNS reply message back to the device 2. In short, the subscriber awareness module 12 stores a corresponding table between users' MSISDN information and IP addresses of target terminals of users' terminals. Therefore, the subscriber awareness module 12 can obtain the IP address of the target terminal according to the MSISDN information and send the IP address of the target terminal back to the MSISDN query module 11. Thereafter, the MSISDN query module 11 can use the IP address of the target terminal to generate the DNS reply message and send the DNS reply message back to the device 2, thus allowing the device 2 to connect to the target terminal 3 according to the obtained IP address of the target terminal 3.

The traffic data transmit and temporary storage module 13 is used to receive data packets generated and sent by the device 2 according to the DNS reply message so as to forward the data packets to the target terminal 3 (or temporarily store the data packets first and then forward the data packets). For instance, after knowing the IP address of the target terminal 3, the device 2 can generate data packets according to the IP address of the target terminal recorded in the DNS reply message, and transmit the data packets to the traffic data transmit and temporary storage module 13. As such, the traffic data transmit and temporary storage module 13 is used for executing the sending of the data packets (e.g., the data packets is directly forwarded to the target terminal 3 by the traffic data transmit and temporary storage module 13, or temporarily stored in the traffic data transmit and temporary storage module 13 and then forwarded).

In an embodiment, after receiving the data packets, the traffic data transmit and temporary storage module 13 first analyzes whether the target terminal 3 is in a connected mode (e.g., at an online state). If the target terminal 3 is in the connected mode, the traffic data transmit and temporary storage module 13 forwards the data packets to the target terminal 3 through a base station. Otherwise, if the target terminal 3 is in an idle mode (e.g., at an idle state), the traffic data transmit and temporary storage module 13 temporarily stores the data packets. After the target terminal 3 is in the connected mode, the traffic data transmit and temporary storage module 13 can forward the data packets. In other words, if the target terminal 3 is in the connected mode, the data packets are directly forwarded to the target terminal 3. Otherwise, the data packets are temporarily stored in a buffer and wait for the target terminal 3 to be in the connected mode again (the target terminal 3 can be woken up through a paging mechanism). If the target terminal 3 is in the connected mode again, the data packets are sent to the target terminal 3. Otherwise, if the target terminal 3 is continuously in a disconnected mode (e.g., offline), the data packets are discarded.

Further, when temporarily storing the data packets, the traffic data transmit and temporary storage module 13 sets a user online timer so as to determine whether the target terminal 3 returns to the connected mode within a predefined time, wherein if the target terminal 3 fails to return to the connected mode within the predefined time, the traffic data transmit and temporary storage module 13 discards the data packets. For instance, the traffic data transmit and temporary storage module 13 wakes up the target terminal 3 through an additional module. Therefore, when temporarily storing the data packets, the traffic data transmit and temporary storage module 13 sets the user online timer so as to determine whether the target terminal 3 returns to the connected mode within the predefined time. If the target terminal 3 fails to return to the connected mode, the communications packets are discarded.

Therefore, the device 2 can obtain the corresponding information of the MSISDN and IP address of the target terminal 3 through DNS and the data transmission system 1 for edge computing operating on the edge computing platform without the need of additional protocols or kits. Further, if the target terminal 3 is in an idle mode, it can be woken up through the data transmission system 1 for edge computing so as to go the connected mode again for communication. Before the data transmission system 1 for edge computing is connected to the target terminal 3, the downlink data packets can be temporarily stored on the data transmission system 1 for edge computing.

Figure 2:
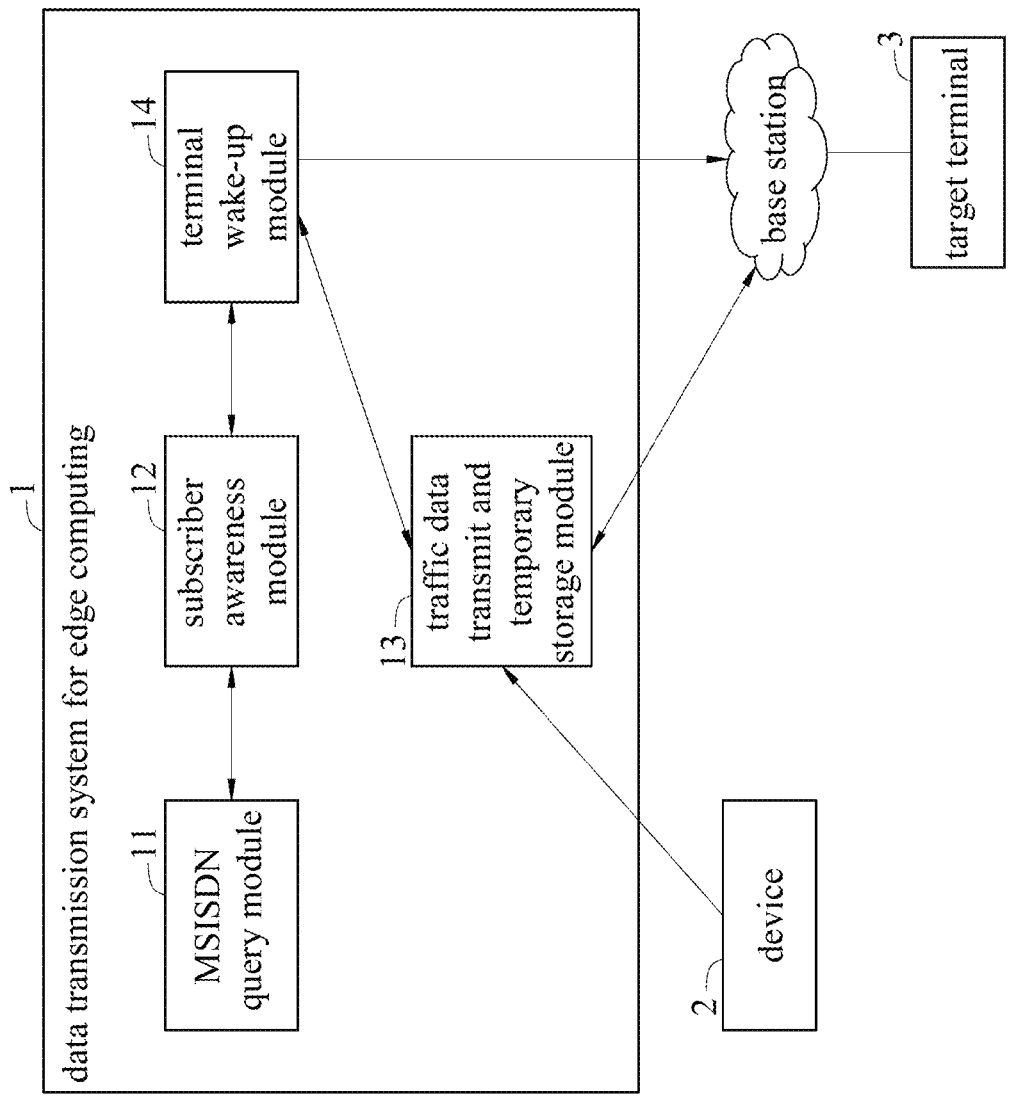
FIG. 2 is a schematic architecture diagram of a data transmission system for edge computing according to another embodiment of the present disclosure.

FIG. 2 is a schematic architecture diagram of a data transmission system for edge computing according to another embodiment of the present disclosure. Referring to FIG. 2, in addition to the MSISDN query module 11, the subscriber awareness module 12 and the traffic data transmit and temporary storage module 13 as described above and in FIG. 1, the data transmission system 1 for edge computing has a terminal wake-up module 14.

The terminal wake-up module 14 is used to receive a paging message so as to wake up the target terminal 3 according to the paging message. The paging message is generated by the traffic data transmit and temporary storage module 13 when it temporarily stores the data packets. As described above, if the traffic data transmit and temporary storage module 13 detects that the target terminal 3 is not in the connected mode, it cannot send the data packets to the target terminal 3. Therefore, when temporarily storing the data packets, the traffic data transmit and temporary storage module 13 generates and transmits a paging message to the terminal wake-up module 14 so as to wake up the target terminal 3, wherein the terminal wake-up module 14 uses the IP address of the target terminal contained in the paging message to query the subscriber awareness module 12 about user identity information, thereby generating the paging message.

In practice, the MSISDN query module 11 captures a block with the MSISDN information from a DNS request sent by the device behind the edge computing platform where the data transmission system 1 for edge computing is located, uses the MSISDN information to query the subscriber awareness module 12 about the IP address of the target terminal 3, and then replies to the inquirer (e.g., the device). The subscriber awareness module 12 stores a corresponding table between MSISDN information and IP addresses of target terminals so as to allow the MSISDN query module 11 and the terminal wake-up module 14 to query the IP address of a target terminal and user identity (ID) such as TMSI. If the target terminal 3 is in the connected mode, the traffic data transmit and temporary storage module 13 sends the data packets to the target terminal 3; otherwise, if the target terminal 3 is in the idle mode, the traffic data transmit and temporary storage module 13 temporarily stores the data packets to be sent to the target terminal 3, sends a paging message (i.e., a paging request) to the terminal wake-up module 14, and sets a user online timer. As such, after the target terminal 3 goes to the connected mode, the traffic data transmit and temporary storage module 13 can send the data packets to the target terminal 3. After receiving the paging message from the traffic data transmit and temporary storage module 13, the terminal wake-up module 14 uses the IP address of the target terminal to obtain TMSI (Temporary Mobile Subscriber Identity)/IIVISI (International Mobile Subscriber Identity) of LIE (long term evolution) and NSA (non-standalone) terminals or 5G-TMSI/SUPI (Subscription Permanent Identifier) of standalone (SA) terminals from the subscriber awareness module 12, thereby generating the paging message. The paging message is sent to the base station so as to wake up the target terminal 3. If the target terminal 3 is within the coverage of the base station under the edge computing platform, it sends a service request message to go to the connected mode again.

Furthermore, the MSISDN query module 11, the subscriber awareness module 12, the traffic data transmit and temporary storage module 13 and the terminal wake-up module 14 of the data transmission system 1 for edge computing can be arranged on the same hardware platform, and programming interfaces can be used for communication between the modules. Further, the above-described modules can be arranged on different hardware platforms, and IP-based communication protocols can be used for communication between the modules.

Figure 3:
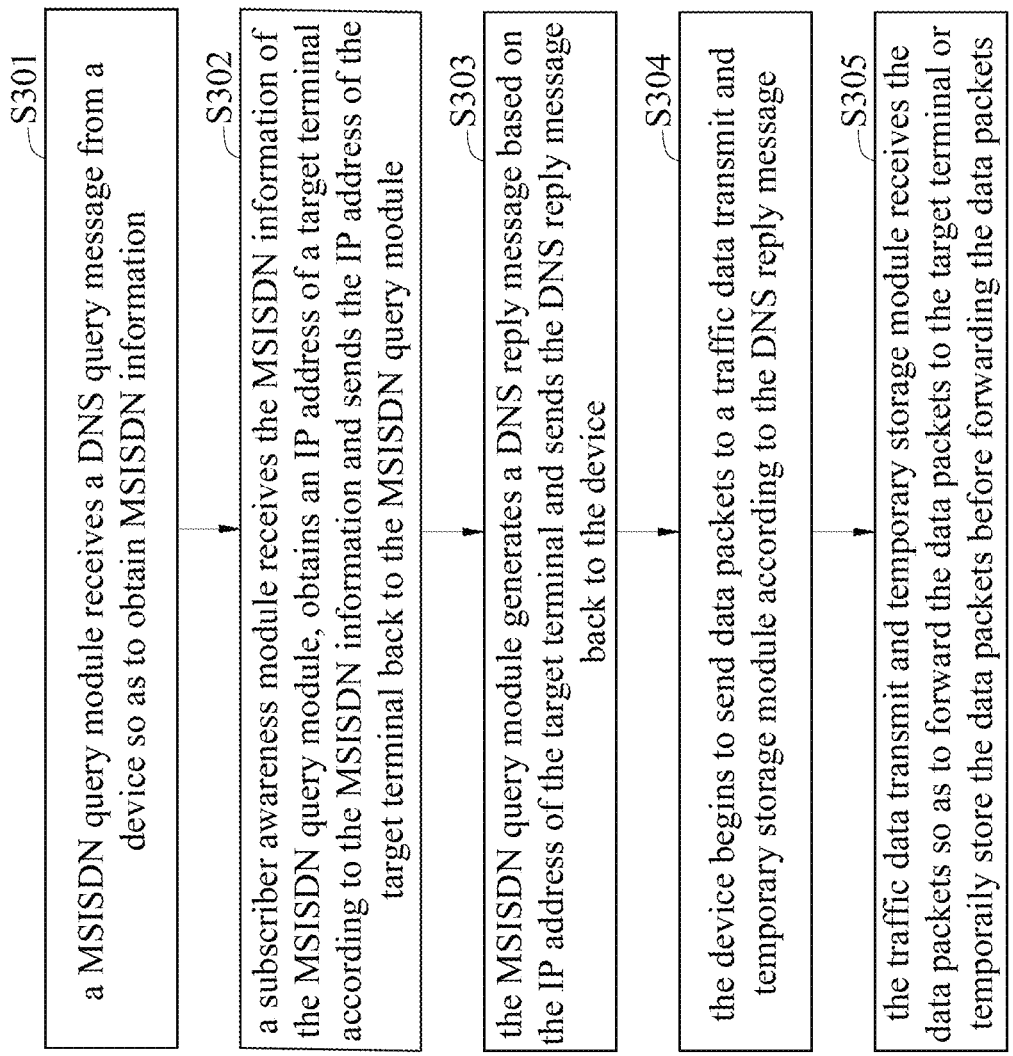
FIG. 3 is a schematic flow diagram illustrating a data transmission method for edge computing according to the present disclosure.

FIG. 3 is a schematic flow diagram illustrating a data transmission method for edge computing according to the present disclosure. The data transmission method for edge computing of the present disclosure can be executed on a computer device such as a personal computer, a server or a cloud device. As such, by using DNS, a service providing device can query and obtain MSISDN and IP address of a target terminal from data transmission for edge computing on an edge computing platform without the need of using additional protocols or kits. Further, the service providing device can actively send data packets to the target terminal without being limited by the type of communication protocol of the upper-layer application service, thereby greatly increasing the service type and flexibility. The data transmission method for edge computing of the present disclosure includes the following steps.

At step S301, a MSISDN query module receives a DNS query message from a device so as to obtain MSISDN information. At this step, the MSISDN query module receives the DNS query message from the device and obtains the MSISDN information from the DNS query message. The DNS query message is generated when the device wants to send data packets.

At step S302, a subscriber awareness module receives the MSISDN information of the MSISDN query module, obtains an IP address of a target terminal according to the MSISDN information and sends the IP address of the target terminal back to the MSISDN query module. At this step, the MSISDN query module queries the subscriber awareness module about the IP address of the target terminal corresponding to the MSISDN information. Information such as MSISDN information and IP addresses of target terminals of the terminal device are pre-stored in the subscriber awareness module for queries.

At step S303, the MSISDN query module generates a DNS reply message based on the IP address of the target terminal and sends the DNS reply message back to the device. At this step, after obtaining the IP address of the target terminal from the subscriber awareness module, the MSISDN query module generates the DNS reply message according to the IP address of the target terminal so as to reply to the previous query of the device.

At step S304, the device begins to send data packets to a traffic data transmit and temporary storage module according to the DNS reply message. At this step, after receiving the DNS reply message from the MSISDN query module, the device can obtain the IP address of the target terminal from the DNS reply message and send the data packets according to the IP address of the target terminal. The data packets will be sent to the traffic data transmit and temporary storage module first.

At step S305, the traffic data transmit and temporary storage module receives the data packets so as to forward the data packets to the target terminal or temporarily store the data packets before forwarding the data packets. At this step, after receiving the data packets, the traffic data transmit and temporary storage module determines whether to directly forward the data packets to the target terminal or temporarily store the data packets before forwarding according to the mode/state of the target terminal.

In detail, the traffic data transmit and temporary storage module analyzes whether the target terminal is in a connected mode. If the target terminal is in the connected mode, the traffic data transmit and temporary storage module forwards the data packets to the target terminal through a base station. Otherwise, if the target terminal is in an idle mode, the traffic data transmit and temporary storage module temporarily stores the data packets. After the target terminal is in the connected mode, the traffic data transmit and temporary storage module will forward the data packets. Further, the present disclosure wakes up the target terminal in the idle mode by using paging, wherein after temporarily storing the data packets, the traffic data transmit and temporary storage module causes (e.g., notifies) a terminal wake-up module to send a paging message so as to wake up the target terminal, and the terminal wake-up module can use the IP address of the target terminal to query the subscriber awareness module about identity information of the user so as to generate the paging message. After the target terminal goes back to the connected mode, the traffic data transmit and temporary storage module sends the data packets to the target terminal.

Further, in order to prevent that the target terminal is continuously in the disconnected mode (e.g., at an offline state) and the data packets are still stored in the traffic data transmit and temporary storage module, the present disclosure proposes a packet discarding mechanism. For instance, when temporarily storing the data packets, the traffic data transmit and temporary storage module sets a user online timer so as to determine whether the target terminal returns to the connected mode within a predefined time. If the target terminal fails to return to the connected mode within the predefined time, the traffic data transmit and temporary storage module discards the data packets.

Figure 4:
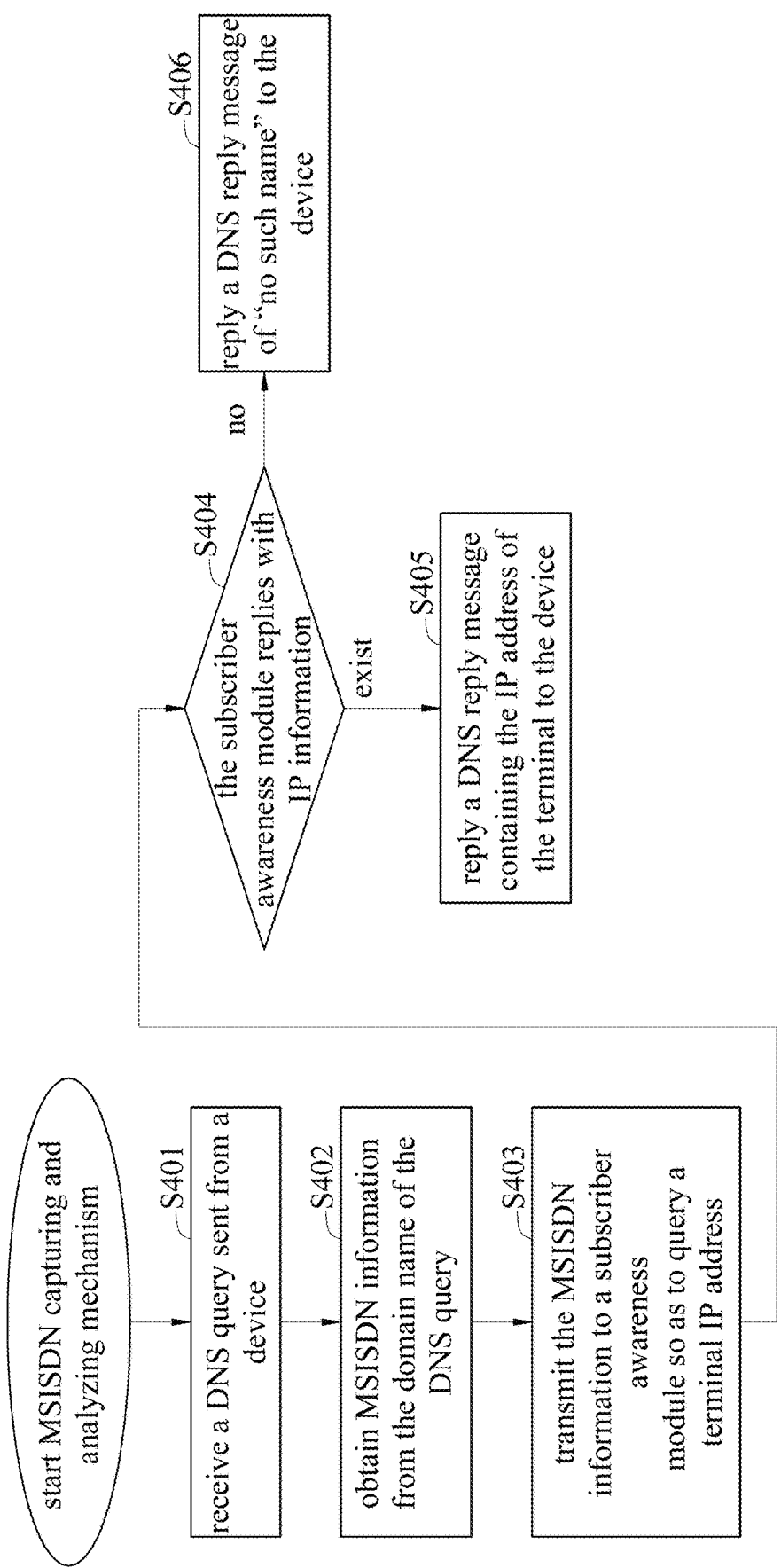
FIG. 4 is a schematic flow diagram illustrating a MSISDN capturing and analyzing mechanism according to the present disclosure.

FIG. 4 is a schematic flow diagram illustrating a MSISDN capturing and analyzing mechanism according to the present disclosure. As shown, first, at step S401, a DNS query sent from a device is received. Then, at step S402, the MSISDN information is obtained from the domain name of the DNS query. Thereafter, at step S403, the MSISDN information is transmitted to a subscriber awareness module so as to query the IP address of the terminal. Then, at step S404, the subscriber awareness module replies with IP information. If the IP address exists, the process proceeds to step S405, where a DNS reply message containing the IP address of the terminal is replied (e.g., sent) to the device. Otherwise, the process proceeds to step S406, where a DNS reply message of "no such name" is replied to the device.

In other words, when the data transmission system for edge computing (located on an edge computing platform that provides edge computing) receives a DNS query request of querying the IP address of the target terminal from a rear device, the MSISDN query module analyzes the domain name of the DNS query, obtains MSISDN information therefrom, and transmits the MSISDN information to the subscriber awareness module so as to query the IP address of the target terminal. Then, the MSISDN query module analyzes the reply of the subscriber awareness module. If the subscriber awareness module finds the corresponding information between the IP address of the target terminal and the MSISDN information, it sends the MSISDN information and the corresponding IP address of the target terminal back to the MSISDN query module, and thus the MSISDN query module sends a DNS reply message (e.g., a DNS response) containing the IP address of the target terminal to the device. If the subscriber awareness module does not find the corresponding information, the MSISDN query module sends a DNS reply message of "no such name" to the device.

Figure 5:
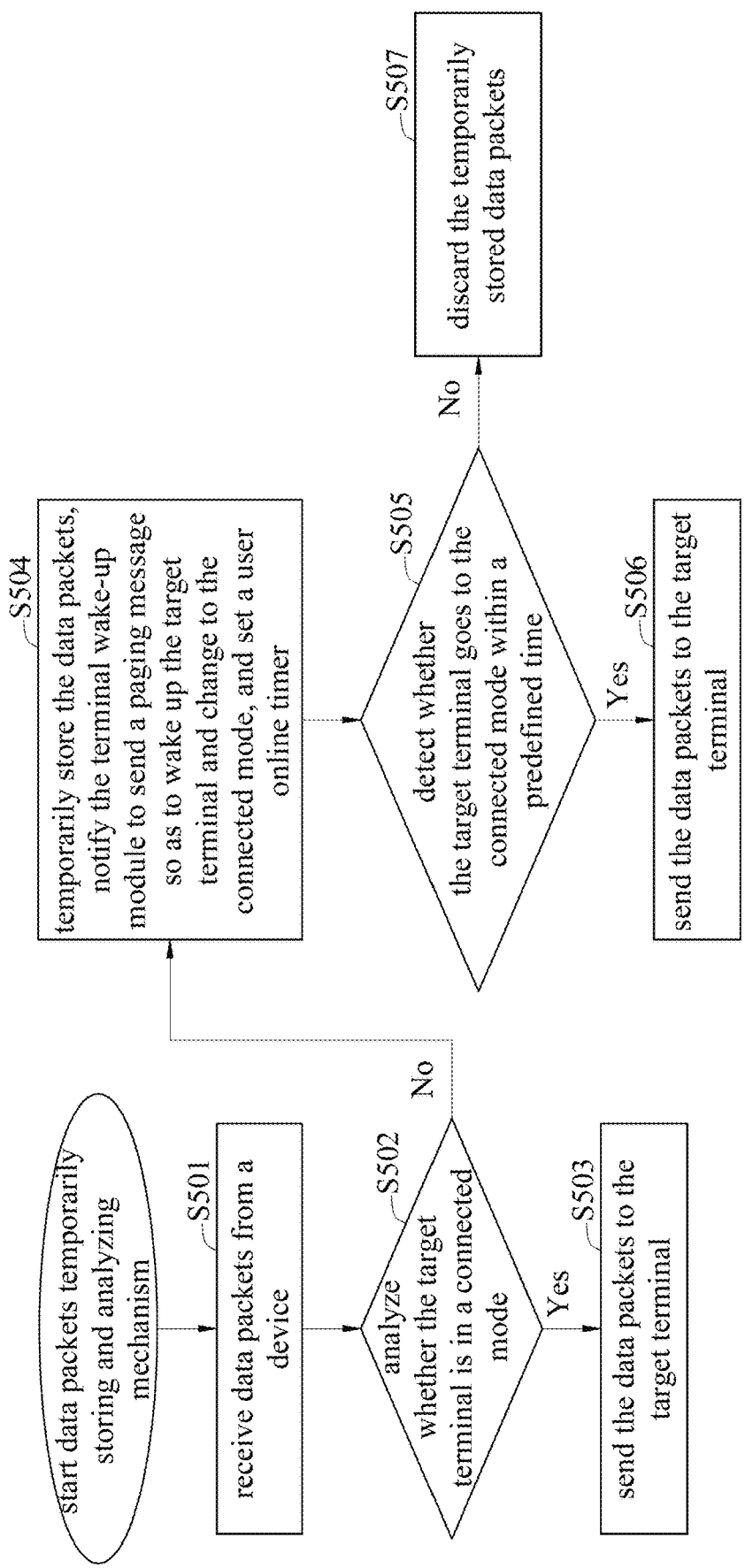
FIG. 5 is a schematic flow diagram illustrating a communication temporarily storing and analyzing mechanism according to the present disclosure.

FIG. 5 is a schematic flow diagram illustrating a communication temporarily storing and analyzing mechanism according to the present disclosure. As shown, first, at step S501, data packets are received from a device. Then, at step S502, whether the target terminal is in the connected mode is analyzed. If yes, the process proceeds to step S503, where the data packets are sent to the target terminal, thus completing transmission of the data packets. Otherwise, the process proceeds to step S504, where the data packets are temporarily stored, a paging message is sent by a terminal wake-up module so as to wake up the target terminal and change to the connected mode, and a user online timer is set. At this point, the data packets are temporarily stored and wait for the target terminal to be in the connected mode. Next, at step S505, whether the target terminal goes to the connected mode within a predefined time is detected. If yes, the process proceeds to step S506, where the data packets are sent to the target terminal. Otherwise, the process proceeds to S507, where the data packets are discarded.

In detail, after a device sends data packets to the data transmission system for edge computing, the traffic data transmit and temporary storage module receives the data packets and analyzes whether the target terminal is in a connected mode, wherein if the target terminal is in the connected mode, the traffic data transmit and temporary storage module sends the data packets to the target terminal; otherwise, if the target terminal is in an idle mode, the traffic data transmit and temporary storage module temporarily stores the data packets, sets a user online timer, and then causes (e.g., notifies) the terminal wake-up module to send a paging message so as to wake up the target terminal. Meanwhile, the traffic data transmit and temporary storage module detects whether the target terminal returns to the connected mode within the predefined time. If yes, the traffic data transmit and temporary storage module sends the data packets to the target terminal. Otherwise, the traffic data transmit and temporary storage module discards the data packets.

Figure 6:
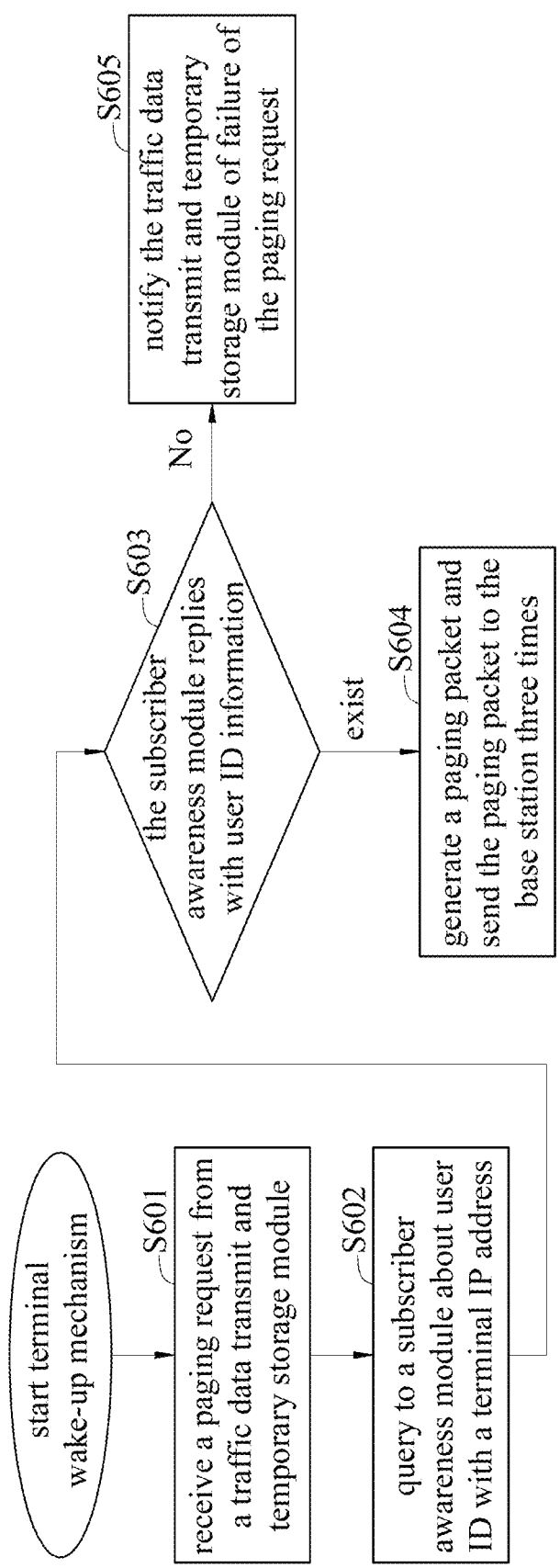
FIG. 6 is a schematic flow diagram illustrating a terminal wake-up mechanism according to the present disclosure.

FIG. 6 is a schematic flow diagram illustrating a terminal wake-up mechanism according to the present disclosure. As shown, first, at step S601, a paging request from a traffic data transmit and temporary storage module is received. Then, at step S602, a subscriber awareness module is queried about user ID with a terminal IP address. Thereafter, at step S603, the subscriber awareness module replies with user ID information. If the user ID exists, the process proceeds to S604, where a paging packet is generated and sent to the base station three times. Otherwise, the process proceeds to step S605, where the traffic data transmit and temporary storage module is notified of failure of the paging request.

In an embodiment, when receiving a paging request from a traffic data transmit and temporary storage module, a terminal wake-up module queries a subscriber awareness module about user ID information with the IP address of a target terminal (e.g., TMSFIMSI of LTE and NSA, TMSI/SUPI of SA), and analyzes the reply of the subscriber awareness module. If the reply contains user ID information, the terminal wake-up module generates a paging message and sends it to all base stations covered by the edge computing platform where the data transmission system for edge computing is located several times (for example, three times). If the corresponding user ID information does not exist, the terminal wake-up module notifies the traffic data transmit and temporary storage module of failure of the paging request.

Figure 7:
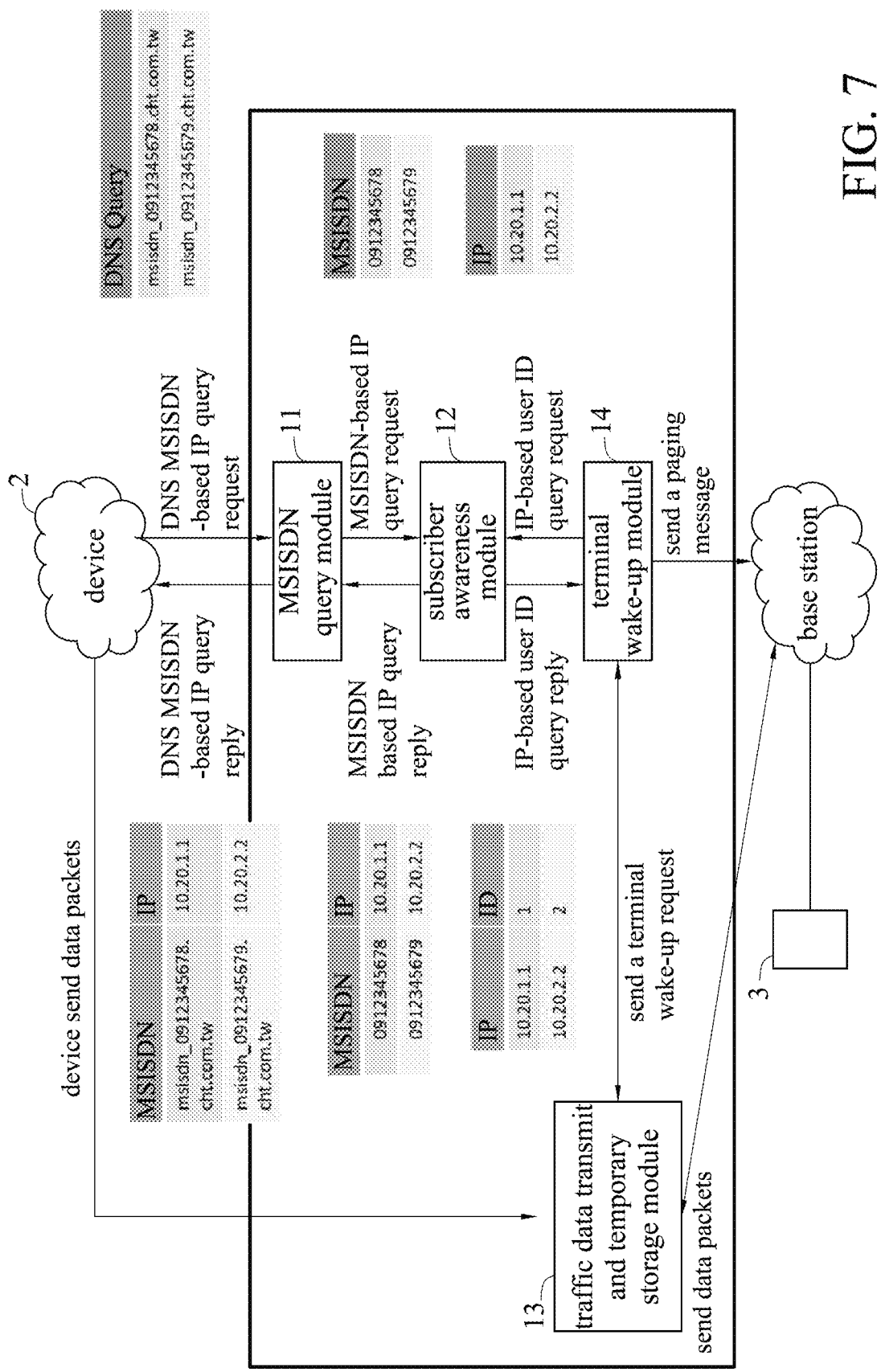
FIG. 7 is a schematic diagram showing implementation of a data transmission system for edge computing according to the present disclosure.

FIG. 7 is a schematic diagram showing an implementation of a data transmission system for edge computing according to the present disclosure. As shown, the device 2 sends a DNS MSISDN-based IP query request to the MSISDN query module 11. For example, the DNS MSISDN-based IP query request contains "msisdn 0912345678.cht.com.tw" and "msisdn_0912345679.cht.com.tw." After receiving and analyzing the DNS MSISDN-based IP query request, the MSISDN query module 11 obtains MSISDN information of "0912345678" and "0912345679" from the request and sends a MSISDN-based IP query request to the subscriber awareness module 12. Therein, the MSISDN-based IP query request contains the MSISDN information. After querying, the subscriber awareness module 12 obtains IP addresses of "10.20.1.1" and "10.20.2.2" corresponding to the MSISDNs "0912345678" and "0912345679," respectively. The subscriber awareness module 12 sends the above information back to the MSISDN query module 11 with a MSISDN-based IP query reply, and the MSISDN query module 11 then sends the information to the device 2 with a DNS MSISDN-based IP query reply. As such, the device 2 gets the IP addresses of the users to which it will provide services.

After getting the IP addresses of the users, the device 2 can send data packets, which contain DNS and IP addresses corresponding to the MSISDNs. For example, "msisdn 0912345678.cht.com.tw" corresponds to "10.20.1.1," and "msisdn 0912345679.cht.com.tw" corresponds to "10.20.2.2." The device 2 sends the data packets to the traffic data transmit and temporary storage module 13, and the traffic data transmit and temporary storage module 13 determines whether the target terminal 3 is in a connected mode. If yes, the traffic data transmit and temporary storage module 13 directly sends the data packets to the target terminal 3 through the base station. Otherwise, the traffic data transmit and temporary storage module 13 sends a terminal wake-up request to the terminal wake-up module 14. After receiving the terminal wake-up request, the terminal wake-up module 14 sends an IP-based user ID query request to the subscriber awareness module 12 so as to query user IDs. The IP-based user ID query request contains IP addresses such as "10.20.1.1" and "10.20.2.2." After querying, the subscriber awareness module 12 sends an IP-based user ID query reply to the terminal wake-up module 14. For example, the IP-based user ID query reply contains a user ID of 1 corresponding to "10.20.1.1" and a user ID of 2 corresponding to "10.20.2.2." As such, the terminal wake-up module 14 can send a paging message to wake up the target terminal 3. If the IP-based user ID query reply contains no user ID, the terminal wake-up module 14 sends the above information to the traffic data transmit and temporary storage module 13 and the data packets are discarded by the traffic data transmit and temporary storage module 13.

Further, after the terminal wake-up module 14 sends the paging message, the traffic data transmit and temporary storage module 13 determines whether the target terminal 3 is in the connected mode. Further, the traffic data transmit and temporary storage module 13 waits for the target terminal 3 to return to the connected mode with the waiting time being measured and counted. If the target terminal 3 is continuously in the disconnected mode, the traffic data transmit and temporary storage module 13 discards the data packets.

Figure 8:
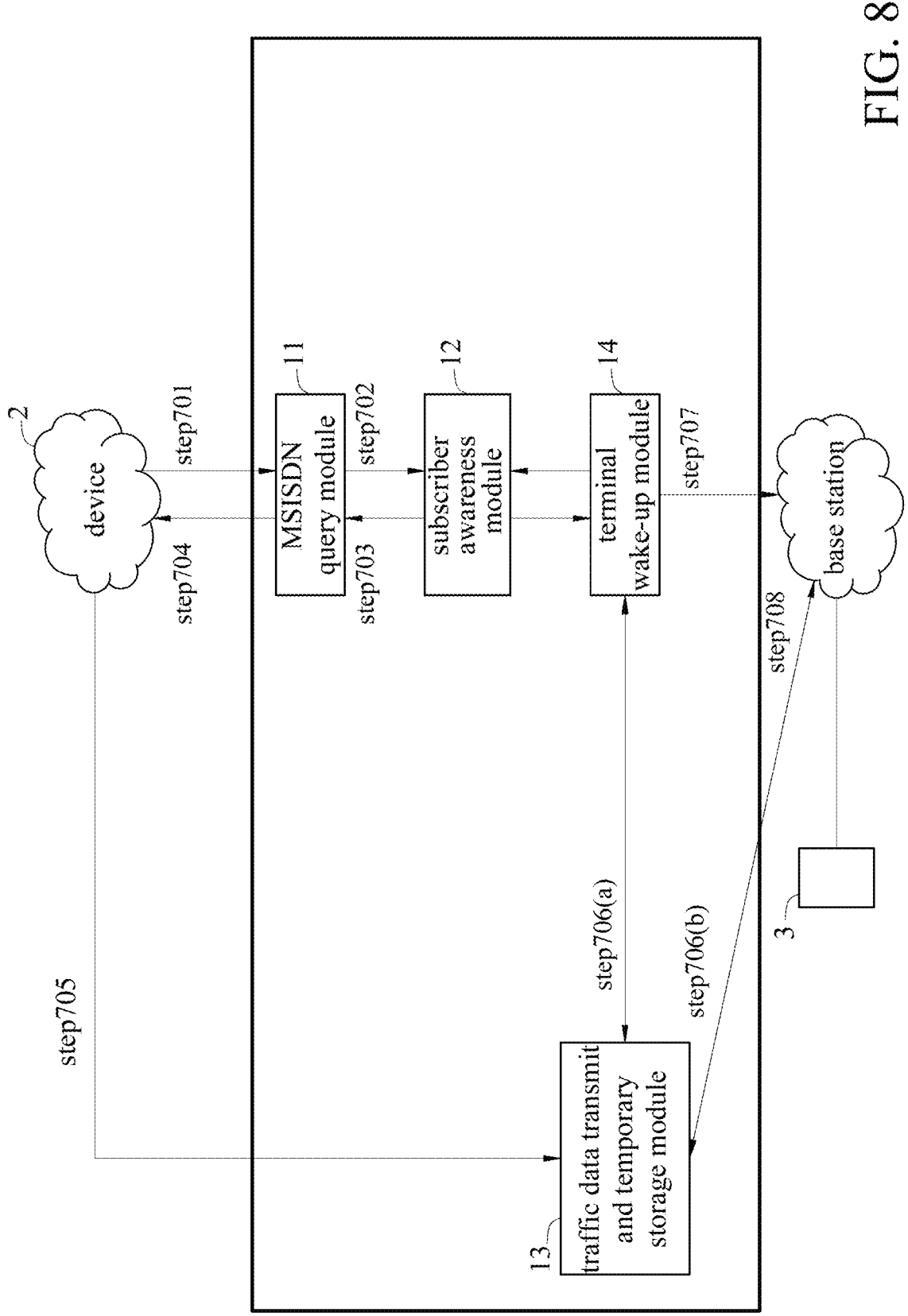
FIG. 8 is a schematic diagram showing a data transmission system for edge computing in conjunction with an operation method thereof according to the present disclosure.

FIG. 8 is a schematic diagram showing a data transmission system for edge computing in conjunction with an operation method thereof according to the present disclosure. FIG. 8 has the same system architecture as that of FIG. 7. The operation process is described as follows. At step 701, when the device 2 behind the data transmission system for edge computing wants to send data packets, it first sends a DNS query request containing MSISDN information to the MSISDN query module 11 so as to obtain a terminal IP address. At step S702, after receiving the DNS query request, the MSISDN query module 11 analyzes and obtains MSISDN information therefrom, and transmits the MSISDN information to the subscriber awareness module 12 so as to query the terminal IP address corresponding to the MSISDN. At step 703, after receiving the terminal IP address query request, the subscriber awareness module 12 replies to the MSISDN query module 11 with a query result. At step 704, after receiving the reply of the subscriber awareness module 12, the MSISDN query module 11 sends a DNS reply (e.g., a DNS response) to the device 2. At step 705, after getting the terminal IP address corresponding to the MSISDN, the device begins to send the data packets to the traffic data transmit and temporary storage module 13.

After receiving the data packets, the traffic data transmit and temporary storage module 13 detects whether the target terminal 3 is in the connected mode. If the target terminal 3 is in the connected mode, step 706 (b) is performed to send the data packets. That is, the data packets are forwarded to the target terminal 3 through the base station. Otherwise, if the target terminal 3 is not in the connected mode, step 706 (a) is performed to temporarily store the data packets in a buffer, set a user online timer and then send a paging request to the terminal wake-up module 14. At step 707, after receiving the paging request, the terminal wake-up module 14 queries the subscriber awareness module 12 about user ID with the terminal IP address so as to generate and send a paging message to all base stations covered by the edge computing platform where the system is located several times (e.g., three times). At step 708, the traffic data transmit and temporary storage module 13 continuously detects whether the target terminal 3 returns to the connected mode within a predefined time. If the target terminal 3 returns to the connected mode within the predefined time, the traffic data transmit and temporary storage module 13 sends the data packets to the target terminal 3. If the target terminal 3 is still in the disconnected mode after three paging times, the traffic data transmit and temporary storage module 13 discards the data packets in the buffer.

In addition, the present disclosure discloses a computer readable medium applied in a computing device or computer with a processor (e.g., CPU or GPU) and/or memory and storing instructions for performing the above-described data transmission method and steps.

The modules, units and devices of the present disclosure include microprocessors and memories, and algorithms, data and programs are stored in the memories or chips. The microprocessors can load data or algorithms or programs from the memories for data analysis or calculation. In other words, the data transmission system for edge computing of the present disclosure can be performed on an electronic device such as a general computer, a tablet or a server, and performed analysis and calculation after receiving information. Therefore, the processes of the data transmission system for edge computing can be designed and constructed on electronic devices with such as processors and memories via software design so as to operate on various electronic devices. Further, each module of the data transmission system for edge computing can be an independent element, which is designed as, for example, a calculator, a memory, a storage or a firmware with a processing unit, or has a software, hardware or firmware architecture.

Therefore, the data transmission system and method for edge computing and the computer readable medium thereof are applicable to data transmission of mobile edge computing. When mobile users conduct online services in a mobile edge computing area, the MSISDN query module captures a block with MSISDN information from a DNS request sent from a device behind the edge computing platform, and queries the subscriber awareness module about the IP address of the target terminal with the MSISDN information, and then replies to the inquirer (e.g., the device). After the device sends data packets to the traffic data transmit and temporary storage module, the traffic data transmit and temporary storage module determines whether the target terminal (user terminal) is in a connected mode or in an idle mode. If the target terminal is in the connected mode, the traffic data transmit and temporary storage module forwards the information (i.e., the data packets) to the target terminal through the base station. If the target terminal is in the idle mode, the traffic data transmit and temporary storage module temporarily stores the information (the data packets), sets a user online timer, and then notifies the terminal wake-up module. The terminal wake-up terminal generates and sends a paging message to the base station so as to wake up the target terminal. After the target terminal returns to the connected mode, the traffic data transmit and temporary storage module sends the temporarily stored information (data packets) to the terminal. The present disclosure achieves the following effects.

First, the present disclosure allows the device for providing communication services to obtain corresponding information of the MSISDN and IP address of the target terminal through DNS and the data transmission system for edge computing operating on the edge computing platform without the need of additional protocols or kits.

Second, if the target terminal is in the idle mode, the terminal wake-up module sends a paging message so as to enable the target terminal to return to the connected mode for communication.

Third, the downlink data packets can be temporarily stored before the data transmission system for edge computing is connected to the target terminal.

The above-described descriptions of the detailed embodiments are to illustrate the implementations according to the present disclosure, and it is not to limit the scope of the present disclosure. Accordingly, all modifications and variations completed by those with ordinary skill in the art should fall within the scope of present disclosure defined by the appended claims.

What is claimed is:

1. A data transmission system for edge computing, comprising:
    a mobile station international subscriber directory number (MSISDN) query module configured to receive a domain name system (DNS) query message from a device to obtain MSISDN information;
    a subscriber awareness module configured to receive the MSISDN information, obtain an IP address of a target terminal according to the MSISDN information and send the IP address of the target terminal back to the MSISDN query module for the MSISDN query module to generate a DNS reply message based on the IP address of the target terminal and send the DNS reply message back to the device; and
    a traffic data transmit and temporary storage module configured to receive data packets generated and sent by the device according to the DNS reply message to forward or temporarily store the data packets; and
    a terminal wake-up module configured to receive a paging message to wake up the target terminal according to the paging message, wherein the paging message is generated by the traffic data transmit and temporary storage module when the traffic data transmit and temporary storage module temporarily stores the data packets.

2. The data transmission system of claim 1, wherein the DNS query message is generated when the device wants to send the data packets.

3. The data transmission system of claim 1, wherein the traffic data transmit and temporary storage module first analyzes whether the target terminal is in a connected mode after receiving the data packets, wherein the traffic data transmit and temporary storage module forwards the data packets to the target terminal via a base station if the target terminal is in the connected mode, or wherein the traffic data transmit and temporary storage module temporarily stores the data packets if the target terminal is in an idle mode and forwards the data packets when the target terminal is in the connected mode.

4. The data transmission system of claim 1, wherein the terminal wake-up module uses the IP address of the target terminal to query the subscriber awareness module about identity information of a user to generate the paging message.

5. The data transmission system of claim 1, wherein the traffic data transmit and temporary storage module sets a user online timer to determine whether the target terminal returns to a connected mode within a predefined time when the communication sending and temporary storage temporarily stores the data packets, wherein the traffic data transmit and temporary storage module discards the data packets if the target terminal fails to return to the connected mode within the predefined time.

6. A data transmission method for edge computing, executed by a computer device, comprising:
- receiving, by a mobile station international subscriber directory number (MSISDN) query module, a domain name system (DNS) query message from a device to obtain MSISDN information;
- receiving, by a subscriber awareness module, the MSISDN information of the MSISDN query module, wherein the subscriber awareness module obtains an IP address of a target terminal according to the MSISDN information and sends the IP address of the target terminal back to the MSISDN query module;
- generating, by the MSISDN query module, a DNS reply message based on the IP address of the target terminal;
- sending the DNS reply message back to the device;
- sending, by the device, data packets to a traffic data transmit and temporary storage module according to the DNS reply message; and
- receiving, by the traffic data transmit and temporary storage module, the data packets to forward or temporarily store the data packets,
- wherein the traffic data transmit and temporary storage module notifies a terminal wake-up module to send a paging message to wake up the target terminal after temporarily storing the data packets, and wherein the traffic data transmit and temporary storage module sends the data packets to the target terminal after the target terminal returns to a connected mode.

7. The data transmission method of claim 6, wherein the DNS query message is generated when the device wants to send the data packets.

8. The data transmission method of claim 6, wherein the step of receiving the data packets by the traffic data transmit and temporary storage module to forward or temporarily store the data packets comprises: analyzing, by the traffic data transmit and temporary storage module, whether the target terminal is in the connected mode, wherein the traffic data transmit and temporary storage module forwards the data packets to the target terminal via a base station if the target terminal is in the connected mode, or wherein the traffic data transmit and temporary storage module temporarily stores the data packets if the target terminal is in an idle mode and forwards the data packets when the target terminal is in the connected mode.

9. The data transmission method of claim 6, wherein the terminal wake-up module uses the IP address of the target terminal to query the subscriber awareness module about identity information of a user to generate the paging message.

10. The data transmission method of claim 6, further comprising setting, by the traffic data transmit and temporary storage module, a user online timer to determine whether the target terminal returns to the connected mode within a predefined time when the traffic data transmit and temporary storage module temporarily stores the data packets, wherein the traffic data transmit and temporary storage module discards the data packets if the target terminal fails to return to the connected mode within the predefined time.

11. A non-transitory computer readable medium having stored therein instructions executable by a computing device or computer for performing the data transmission method for edge computing according to claim 6.

* * * * *